United States Patent [19]

O'Connor

[11] Patent Number: 4,879,792

[45] Date of Patent: Nov. 14, 1989

[54] METHOD OF BALANCING ROTORS

[75] Inventor: Gerald J. O'Connor, Jupiter, Fla.

[73] Assignee: UnitedTechnologies Corporation, Hartford, Conn.

[21] Appl. No.: 268,138

[22] Filed: Nov. 7, 1988

[51] Int. Cl.⁴ .................. F16F 15/22; B21K 3/00
[52] U.S. Cl. .................. 29/156.4 R; 29/156.8 R; 74/572; 74/573 R; 73/455
[58] Field of Search .............. 73/455, 459; 29/407, 29/901, 159 R, 156.4 R, 156.8 R, 156.8 CF; 74/573 R, 572; 416/144

[56] References Cited

U.S. PATENT DOCUMENTS

| | | | |
|---|---|---|---|
| 3,916,495 | 11/1975 | Klassen et al. | 29/156.4 R |
| 4,477,226 | 10/1984 | Carreno | 416/144 |
| 4,716,761 | 1/1988 | Ito et al. | 73/455 |
| 4,784,012 | 11/1988 | Marra | 74/573 R |
| 4,803,893 | 2/1989 | Bachinski | 74/573 R |
| 4,817,429 | 4/1989 | Goebel | 73/459 |
| 4,817,455 | 4/1989 | Buxe | 74/573 R |
| 4,835,827 | 7/1989 | Marra | 74/573 R X |

Primary Examiner—John Chapman
Assistant Examiner—Robert P. Bell
Attorney, Agent, or Firm—Edward L. Kochey, Jr.

[57] ABSTRACT

Given limitations on potential locations, weight sizes and amount of weights all possible applied unbalance magnitudes and angles are calculated after determining the initial unbalance magnitude and angle of the rotor this result is vector summed with all possible applied unbalances. The lowest resultant magnitude is determined, independent of the angle. The corresponding weight combination produces the lowest possible residual unbalance within the constraints.

6 Claims, 2 Drawing Sheets

METHOD OF BALANCING ROTORS

The Government has rights in this invention pursuant to a contract awarded by the Department of the Air Force.

DESCRIPTION

TECHNICAL FIELD

The invention relates to balancing of rotors by adding weights and in particular to a method of selecting the weights and weight locations.

BACKGROUND OF THE INVENTION

Rotating equipment will usually have unbalance in the as fabricated state. Operation with such unbalance creates vibration and damage. It is accordingly well known to balance the as fabricated rotor prior to use.

In balancing the typical turbine rotor, it is rotated at some speed such as 900 RPM with balancing machines capable of detecting the angle and amount of the unbalance. If an infinite gradation of counterweights were available and an infinite number of locations were available, it would be a simple matter to place the appropriate weight precisely opposite the measured unbalance location.

Typically, however, because of inventory problems only certain weights are available and because of design requirements only certain preselected locations are available which may accept the counterweights. Accordingly, the counterweights are added at various locations in an attempt to correct the initial unbalance of the rotor and the rotor is again spun and the unbalance measured. A design specification is conventionally set as the maximum acceptable unbalance. If the residual unbalance is not below the specification, they are changed and a new residual unbalance is measured. This iterative trial and error process continues for some time until a combination resulting in an unbalance below the limit is found.

Even when a combination of weights is found which corrects the unbalance to below specification, there is no way of knowing whether or not lowest possible residual unbalance has been attained. While such a selection may meet the specifications, it still results in vibration and long term damage which is in excess of that which would occur had the optimum selection been used.

It is also desirable to use a limited number of weights to minimize stresses and total weight of the engine.

It is an object of the invention to obtain the minimum possible residual unbalance operating within the constraints of weight sizes, weight locations and amount of weights.

SUMMARY OF THE INVENTION

Knowing the class of weights to be used, the limitation on the amount of weights and the possible weight locations, the applied unbalance magnitude is calculated for each possible selection of weights and locations within the limitations. This information is retained.

The rotor is rotated and the initial unbalance magnitude and angle is measured. A plurality of calculated residual unbalances are determined by vector summing the measured initial unbalance magnitude and angle with each applied unbalance magnitude and angle. The minimum value of calculated residual unbalanced magnitude is selected independent of its angle. The weights are installed at the locations and in amounts which produce this minimum value.

This determination may also be accomplished by first selecting all potential magnitude and angle unbalances throughout a range of one-half the angle between potential weight locations. Each of these potential conditions may be compared to the plurality of applied unbalances and a minimum residual unbalance determined for each. In this case, once the actual initial unbalance magnitude and angle is measured, the weight selection may be made by comparing this to the preselected list of potential unbalances.

DESCRIPTION OF THE PREFERRED EMBODIMENT

Figure 1:
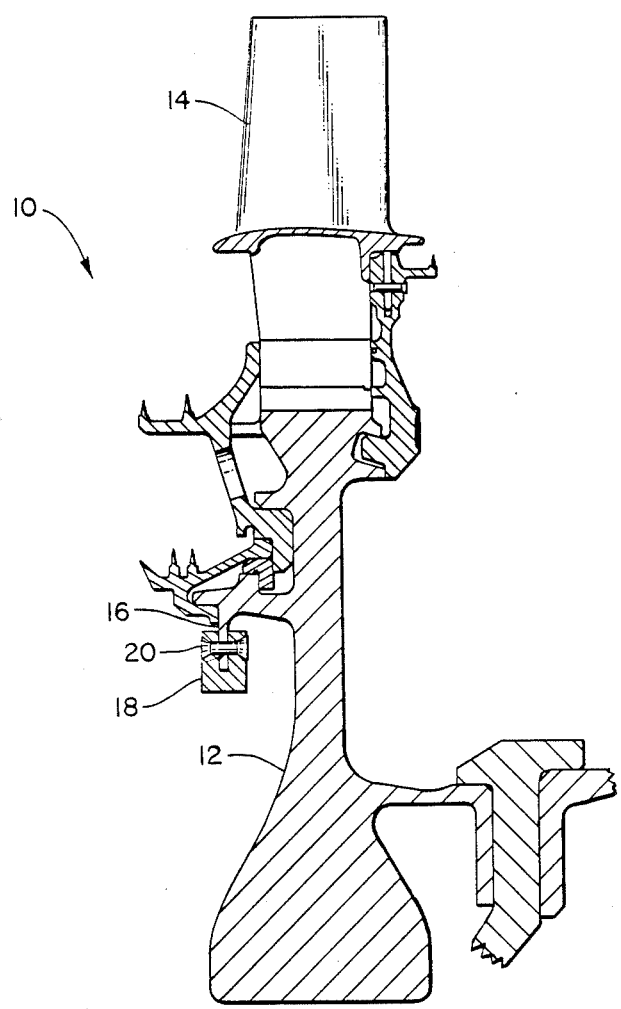
FIG. 1 shows a portion of a turbine rotor to be balanced.
Figure 2:
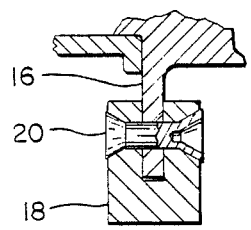
FIG. 2 shows a detail of a balance weight secured to the disk of FIG. 1.

Referring to FIG. 1, the turbine rotor 10 to be balanced includes rotor disk 12 carrying turbine blades 14. An inwardly extending flange 16 is located on the turbine disk with 40 equally spaced holes each adapted to have a weight 18 secured thereto by rivet 20. Four classes of weights 18 are available. A class 1 weight is 0.145 ounces, a class 2 weight is 0.163 ounces, a class 3 weight is 0.183 ounces and a class 4 weight is 0.205 ounces. Each weight when used would be secured to flange 16 by rivet 20 which weighs 0.013 ounces. For all of the calculations described hereinafter this rivet weight is added to the weight of each class of weights for calculating purposes. A limitation of three weights to be used for a balancing operation is imposed to minimize the weight of the final product. The limitation could alternately be on the total weight to be imposed.

Forty holes 22 equally spaced around the rim provide potential weight locations. These holes are accordingly spaced 9 degrees apart. Any hole, such as hole 26 may be arbitrarily selected as the 0 hole with the holes numbered consecutively around the rim. With the holes so identified, calculations for all possible combinations of one, two or three weights selected amongst the four classes of weights are made. The same class weight may be used at all three locations. With the 0 line 28 being selected and a known radius from the centerline of the rotor to the center of gravity of the installed weight, the X and Y component for each of the up to three weights is calculated.

This radius may vary because of the center of gravity location within each weight. For the example herein the radii are 6.504, 6.490, 6.488 and 6.461 inches for classes 1 to 4, respectively.

The radius times the weight times cosine alpha yields the X component of the weight unbalance where alpha is the angle from the 0 line 28 to the hole assumed to contain the weight. Similarly the radius times the weight times sine alpha produces the Y component for that particular weight. The net magnitude of the three weights which is a summation of the radius times equivalent weight, is equal to the square root of the summation of the square of the summation of the X components and the square of the summation of the Y component. This is the applied unbalance magnitude for the particular weight selection.

The angle theta of the particular weight selection is the inverse tangent of the summation of the Y components divided by the summation of the X components. Accordingly, the applied unbalance magnitude and angle for each possible selection of weight classes and weight locations within the limitations is known by calculation.

The rotor to be balanced is spun and the true initial unbalance magnitude and angle is measured. Depending on the balancing equipment being used, this may be determined directly in one operation or may require several. In any event the true initial unbalance is to be determined.

This true initial unbalance magnitude and angle is then vector summed with each of the calculated applied unbalance magnitude and angles, thereby producing a plurality of calculated residual unbalances, one for each weight combination. The minimum value of the calculated residual unbalance magnitude is selected without regard for its angle. The weights are then installed in amounts and at locations producing this minimum value. The unbalance may if desired be again measured with the weights in place. However, because of the approach taken here, a selection is made which produces the absolute minimum residual unbalance possible within the constraints. Accordingly, an improved balancing is obtained since the result is not only within specification, but is the lowest possible unbalance obtainable.

If several combinations result in the same minimum value, the combination producing the fewest weights, or the lowest total weight is selected.

As noted above, the angular spacing between holes is 9 degrees. Assuming potential unbalances of the unbalanced rotor between 0 and 3 ounce inches steps of 0.01 ounce inches are selected. Throughout a range from zero to half the 9 degree angle which is 4½ degrees, a plurality of steps each of 0.5 degrees is selected. This produces a two dimensional range of potential unbalances throughout the 4½ degree angle and 0 to 3 ounce range. Each of these potential magnitude and unbalance combinations may be compared to the plurality of calculated applied unbalance magnitude and angles with the minimum value of a residual unbalance determined for each. Along with this, the particular weight classes and locations producing the minimum value are determined.

For each of the potential unbalance magnitude and angle combinations this determination is made and a result stored. Such storing may be within the memory of a computer or may be tabulated.

Figure 3:
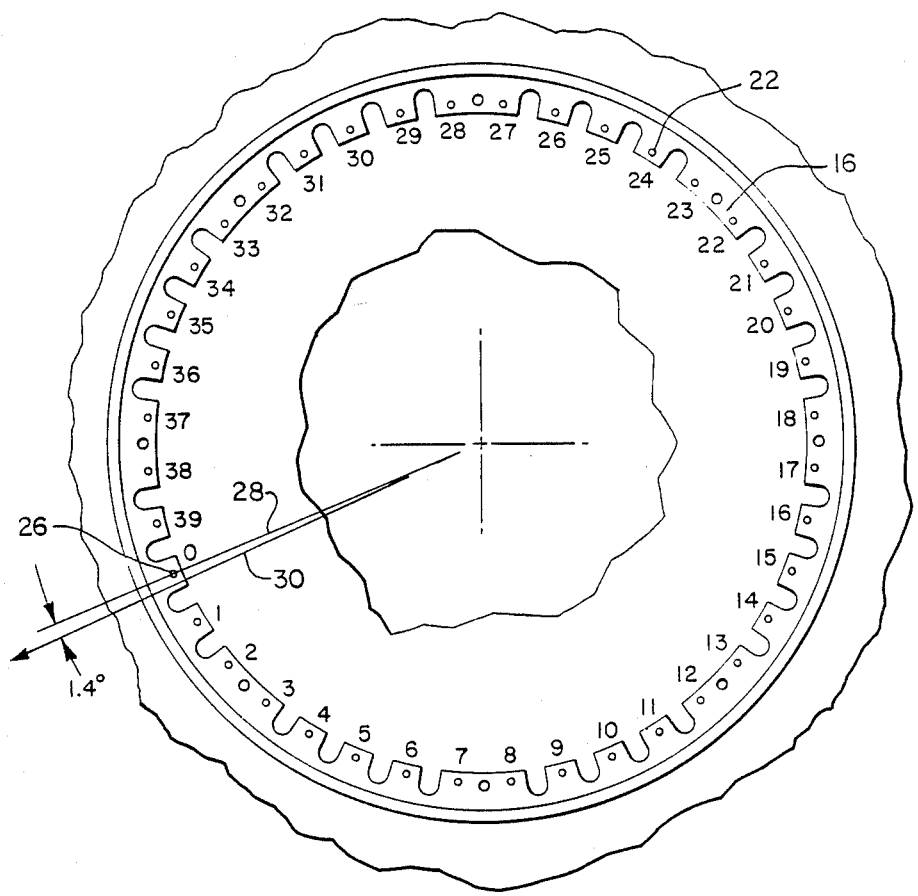
FIG. 3 shows the potential weight locations on the disk.

Assuming that a rotor has been spun and a true unbalance indicated by arrow 30 is 1.97 ounce inches at the indicated angular position shown in FIG. 3. The closest of the potential weight location holes 22 to this unbalance location is selected as 0 hole 26. The holes are then numbered from the 0 location in a direction toward the true unbalance point which is counterclockwise as illustrated in FIG. 3 for this particular situation where the angle between vector 30 and hole 0 is 1.4 degrees. By thereby selecting the relationship between the measured unbalance and the 0 hole the collected information for all potential combinations between 0 and 4½ degrees may be used and the minimum residual unbalance determined. If one should use a chart such as indicated in Appendix A, it can be see that with a magnitude of 1.97 ounce inches and an angle of 1.5 degrees (1.4 degrees rounded to the nearest 0.5 degrees), the lowest residual unbalance is provided with a class one weight at hole #10, a class two weight at hole #20, and a class four weight at hole #26.

| | APPENDIX A | | | | | |
|---|---|---|---|---|---|---|
| INITIAL | | WEIGHT 1 | | WEIGHT 2 | | WEIGHT 3 |
| UNBAL | ANGLE | CLASS | HOLE | CLASS | HOLE | CLASS | HOLE |
| 1.610 | 1.5 | 1 | 14 | 1 | 17 | 4 | 30 |
| 1.620 | 1.5 | 2 | 12 | 1 | 20 | 2 | 29 |
| 1.630 | 1.5 | 1 | 16 | 2 | 18 | 1 | 32 |
| 1.640 | 1.5 | 2 | 8 | 4 | 20 | 3 | 27 |
| 1.650 | 1.5 | 1 | 12 | 2 | 20 | 1 | 29 |
| 1.660 | 1.5 | 4 | 11 | 2 | 22 | 2 | 28 |
| 1.670 | 1.5 | 2 | 6 | 3 | 22 | 3 | 23 |
| 1.680 | 1.5 | 3 | 12 | 1 | 20 | 3 | 29 |
| 1.690 | 1.5 | 1 | 8 | 2 | 21 | 3 | 25 |
| 1.700 | 1.5 | 3 | 10 | 2 | 21 | 3 | 27 |
| 1.710 | 1.5 | 3 | 10 | 2 | 21 | 3 | 27 |
| 1.720 | 1.5 | 3 | 14 | 2 | 20 | 1 | 31 |
| 1.730 | 1.5 | 3 | 12 | 2 | 20 | 3 | 29 |
| 1.740 | 1.5 | 4 | 14 | 4 | 21 | 1 | 33 |
| 1.750 | 1.5 | 3 | 13 | 4 | 19 | 4 | 31 |
| 1.760 | 1.5 | 1 | 9 | 3 | 21 | 2 | 26 |
| 1.770 | 1.5 | 4 | 8 | 3 | 22 | 4 | 25 |
| 1.780 | 1.5 | 4 | 16 | 1 | 26 | | |
| 1.790 | 1.5 | 4 | 16 | 1 | 18 | 3 | 32 |
| 1.800 | 1.5 | 2 | 11 | 4 | 19 | 4 | 29 |
| 1.810 | 1.5 | 1 | 16 | 3 | 17 | 3 | 31 |
| 1.820 | 1.5 | 3 | 12 | 1 | 21 | 2 | 28 |
| 1.830 | 1.5 | 1 | 15 | 4 | 19 | 1 | 32 |
| 1.840 | 1.5 | 2 | 16 | 2 | 18 | 1 | 31 |
| 1.850 | 1.5 | 3 | 11 | 1 | 21 | 3 | 27 |
| 1.860 | 1.5 | 3 | 6 | 4 | 22 | 4 | 23 |
| 1.870 | 1.5 | 4 | 14 | 3 | 19 | 4 | 31 |
| 1.880 | 1.5 | 3 | 10 | 3 | 22 | 2 | 26 |
| 1.890 | 1.5 | 2 | 10 | 4 | 21 | 1 | 27 |
| 1.900 | 1.5 | 4 | 10 | 3 | 21 | 4 | 27 |
| 1.910 | 1.5 | 4 | 11 | 1 | 24 | 2 | 25 |
| 1.920 | 1.5 | 2 | 12 | 1 | 21 | 1 | 27 |
| 1.930 | 1.5 | 4 | 12 | 3 | 20 | 4 | 29 |

-continued

| APPENDIX A | | | | | | |
|---|---|---|---|---|---|---|
| INITIAL | | WEIGHT 1 | | WEIGHT 2 | | WEIGHT 3 | |
| UNBAL | ANGLE | CLASS | HOLE | CLASS | HOLE | CLASS | HOLE |
| 1.940 | 1.5 | 2 | 10 | 2 | 23 | 2 | 24 |
| 1.950 | 1.5 | 2 | 9 | 2 | 21 | 4 | 25 |
| 1.960 | 1.5 | 3 | 10 | 2 | 21 | 4 | 26 |
| 1.970 | 1.5 | 1 | 10 | 2 | 20 | 4 | 26 |
| 1.980 | 1.5 | 1 | 7 | 4 | 22 | 3 | 23 |
| 1.990 | 1.5 | 1 | 10 | 4 | 20 | 3 | .27 |
| 2.000 | 1.5 | 1 | 11 | 4 | 19 | 4 | 28 |

I claim:

1. A method of balancing a rotor having a finite number of potential weight locations, using preselected class weights and limitation on the amount of weights to be used: rotating the rotor;
   measuring the true initial unbalance magnitude and angle of the rotor unbalance;
   calculating the applied unbalance magnitude and angle for each possible selection of weight classes and weight locations within said limitation;
   determining a plurality of calculated residual unbalances by vector summing said initial unbalance magnitude and angle with each calculated applied unbalance magnitude and angle;
   selecting the minimum value of said calculated residual unbalance magnitudes; and
   installing the weights producing said minimum value at the locations producing said minimum value.

2. A method of balancing a rotor having a finite number of potential weight locations, using preselected class weights and limitation on the amount of weights to be used: rotating the rotor comprising:
   calculating the applied unbalance magnitude and angle for each possible selection of weight classes and weight locations within said limitation;
   selecting a plurality of potential unbalance magnitudes and a plurality of potential unbalance angles from 0 to an angle equal to one-half the angle between potential weight locations;
   determining a plurality of calculated residual unbalances by vector summing each potential unbalance magnitude and each potential unbalance angle with each applied unbalance magnitude and angle;
   selecting the minimum residual unbalance magnitude for each anticipated unbalance magnitude and angle;
   identifying the weights and weight locations associated with each selection;
   retaining the identification and corresponding selection in permanent form;
   rotating the rotor;
   measuring the true initial unbalance magnitude and angle of the rotor;
   selecting the closest potential weight location to said true initial unbalance angle;
   determining the working unbalance angle as the angle between said closes potential weight location and said true unbalance angle;
   comparing said working unbalance angle and said true initial unbalance magnitude to the plurality of anticipated unbalance magnitudes and angles, and selecting the closest; and
   installing the weights identified with closest anticipated unbalance magnitude.

3. The method of claim 1, wherein the limitation on the amount of weights comprises:
   a maximum number of weights.

4. The method of claim 1, wherein the limitation on the amount of weights comprises:
   a maximum total weight.

5. The method of claim 3 wherein the step of selecting the minimum value includes:
   determining whether two or more minimum values are the same;
   if so, selecting the weights producing that minimum value from the selection producing the minimum number of weights.

6. The method of claim 4 wherein the step of selecting the minimum value includes:
   determining whether two or more minimum values are the same;
   if so, selecting the weights producing that minimum value from the selection producing the minimum total weight.

* * * * *